(12) United States Patent
Chen et al.

(10) Patent No.: US 11,784,856 B2
(45) Date of Patent: Oct. 10, 2023

(54) AREA EFFICIENT HIGH-SPEED SEQUENCE GENERATOR AND ERROR CHECKER

(71) Applicant: MACOM Technology Solutions Holdings, Inc., Lowell, MA (US)

(72) Inventors: Dianyong Chen, Lowell, MA (US); Rajiv Shukla, Lowell, MA (US); Bengt Littmann, Toronto (CA)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 238 days.

(21) Appl. No.: 17/156,437

(22) Filed: Jan. 22, 2021

(65) Prior Publication Data
US 2022/0239533 A1 Jul. 28, 2022

(51) Int. Cl.
| | | |
|---|---|---|
| H04L 1/00 | (2006.01) | |
| H04L 25/03 | (2006.01) | |
| G06F 1/10 | (2006.01) | |
| H04L 7/04 | (2006.01) | |
| H04L 49/552 | (2022.01) | |

(52) U.S. Cl.
CPC .......... *H04L 25/03286* (2013.01); *G06F 1/10* (2013.01); *H04L 7/048* (2013.01); *H04L 49/552* (2013.01)

(58) Field of Classification Search
CPC . H04L 25/03286; H04L 7/048; H04L 49/552; H04L 25/0272; H04L 25/0292; H04L 1/244; G06F 1/10
USPC ........................................ 714/705, 758, 807
See application file for complete search history.

(56) References Cited

U.S. PATENT DOCUMENTS

| | | | |
|---|---|---|---|
| 5,101,450 A | 3/1992 | Olshansky | |
| 5,604,757 A | 2/1997 | Liang | |
| 6,005,731 A * | 12/1999 | Foland, Jr. ............. | G11B 20/18 |
| 6,044,193 A | 3/2000 | Szentesi | |
| 6,483,620 B1 | 11/2002 | Epworth | |
| 6,483,624 B1 | 11/2002 | Otani | |
| 7,649,855 B1 * | 1/2010 | Lo ......................... | H04L 69/323 |
| | | | 370/278 |

(Continued)

FOREIGN PATENT DOCUMENTS

| | | |
|---|---|---|
| KR | 10-2000-0051885 | 1/2000 |
| KR | 10-2000-0004870 | 8/2000 |

*Primary Examiner* — Albert Decady
*Assistant Examiner* — Osman M Alshack
(74) *Attorney, Agent, or Firm* — Weide & Miller, Ltd.

(57) ABSTRACT

A combined error checker and sequence generator which shares a LFSR is disclosed which reduces complexity, cost, and area required for implementation while also improving timing margin. A clock and data recovery system recovers a data signal received over a channel from a remote transceiver. Control logic selects different modes of operation of the system. An error detector compares the two sequence signals and records errors in response to differences between the two sequence signals. A sequence generator generates a sequence signal for use by the error detector as a reference sequence signal or for transmission to a remote transceiver. The system includes one or more switching elements configured to selectively route the generated sequence as feedback into the sequence generator or the received sequence signal into the sequence generator subject to whether the combined error checker and sequence generator is in error checker mode or sequence generator mode.

17 Claims, 7 Drawing Sheets

(56) References Cited

U.S. PATENT DOCUMENTS

| | | | |
|---|---|---|---|
| 8,413,036 B2* | 4/2013 | Chen | H04L 1/244 |
| | | | 716/136 |
| 9,755,792 B1* | 9/2017 | Lin | G06F 7/582 |
| 2002/0048062 A1 | 4/2002 | Sakamoto | |
| 2004/0033004 A1 | 2/2004 | Welch | |
| 2006/0242483 A1* | 10/2006 | Werner | G11C 29/50 |
| | | | 714/714 |
| 2008/0239668 A1 | 10/2008 | Hendrix | |
| 2011/0013907 A1 | 1/2011 | Sugihara | |
| 2013/0093433 A1* | 4/2013 | Lee | G01R 29/26 |
| | | | 324/614 |
| 2016/0223844 A1 | 8/2016 | Ichikawa | |
| 2017/0192830 A1* | 7/2017 | Bai | G06F 7/584 |
| 2017/0288770 A1 | 10/2017 | Mentovich et al. | |
| 2017/0300392 A1* | 10/2017 | Kang | G06F 11/1608 |
| 2017/0331559 A1 | 11/2017 | Matsushita et al. | |
| 2018/0269645 A1 | 9/2018 | Cannon et al. | |
| 2018/0342265 A1* | 11/2018 | Dietrich | G11C 7/22 |
| 2020/0153509 A1 | 5/2020 | Chen | |
| 2020/0213901 A1* | 7/2020 | Yoshimoto | H04L 5/0048 |

\* cited by examiner

AREA EFFICIENT HIGH-SPEED SEQUENCE GENERATOR AND ERROR CHECKER

1. FIELD OF THE INVENTION

The invention relates to sequence generators and error checkers and in particular to a compact, combined PRBS sequence generator and error checker.

2. RELATED ART

Functionality and complexity are continuously being added to communication systems. To increase testing efficiency, end users request built-in diagnostic features to quickly debug their systems without having to arrange and connect complex and expensive test equipment. In data centers, this means being able to break an underperforming link, inject a known data pattern, such as a pseudo-random bit sequence (PRBS) generator, and check for bit errors at various locations to successfully debug the link.

Industrial standards, such as, IEEE 802.3 bs/cd, define PRBS13Q generation polynomial as $1+x+x^2+x^{12}+x^{13}$ however, other polynomials may be used in other applications. Most popular circuits for PRBS generator and checker are multiplexer (MUX)/demultiplexer (DEMUX) based or linear feedback shift register (LFSR) based, respectively. Pseudo-Random Bit Sequence (PRBS) generators and error checkers are an integral part in many wireline and wireless communication circuits to check signal chain functionality correctness. The generator generates patterns (sequence signals) and sends these patterns to the channel. At a receiving station, the checker checks if there are errors in the received signal.

In the prior art, the sequence generator and error checker are separate modules within each channel path in an integrated circuit. Some PRBS generation polynomials need to be implemented with circuits that have Exclusive OR (XOR) gates with multiple inputs. In designs where area is a critical factor, implementing PRBS generator and checker requires a significant amount of area and the large number of devices diminished timing margin.

FIG. 1 illustrates a prior art transceiver having separate sequence generator and error checker. This embodiment is an optical environment having a lower transmit path and an upper receiver path both on a space limited die 104. In reference to the lower path, differential inputs 108A, 108B receive an outgoing signal for transmission. The inputs 108 connect to an equalizer 112 which performs equalization on the signal prior to transmission. The output of the equalizer 112 feeds into one or more buffers 116, which in turn connect to a clock and data recover circuit (CDR) 120 and to a multiplexer 128. A sequence generator 124 also connects to the multiplexer 128 to provide a pseudorandom number sequence to the multiplexer. The output of the multiplexer connects to a driver 132 configured to present the outgoing signal on output 140. An error checker 136 is configured to receive the outgoing signal and perform error checking based on a comparison to a known and expected bit pattern (sequence), such as might be generated by a sequence generator a transmitting station.

Turning to the upper receive path, an input 150 receives an electrical signal that was converted from an optical signal. The input 150 connects to a transimpedance amplifier (TIA) 154 that includes a feedback resistor 156. The output of the TIA 154 connects to an analog front end (AFE) circuit 160. The AFE circuit 160 connects to a CDR 164 and a multiplexer 168. A sequence generator 172 also provides an input to the multiplexer 168. The multiplexer selectively, based on a control signal, outputs one of the inputs to a driver 172, which in turn provides the received signal on differential outputs 180A, 180B and to an error checker 176. The error check 176 is configured to receive the outgoing signal and perform error checking based on a comparison to a known and expected bit pattern (sequence), such as might be generated by a sequence generator a transmitting station.

As a drawback to this configuration, and as discussed above, the sequence generator and error checker are separate modules and each path as a sequence generator and error checker. Thus, there is duplication of circuitry. The complex PRBS generation polynomials are implemented with circuits that have Exclusive OR (XOR) gates with multiplex inputs. In high speed circuits working at multi-gigahertz and above, XOR gates are not area efficient and require an undesirably large number of transistors to implement.

FIG. 2 illustrates an exemplary circuit for implementing two-input differential XOR gate in BICMOS. This figure is provided for purposes of discussion and to aid understanding the number of transistors and complexity to implement even a two-input XOR gate. The two inputs are A+ and A−, representing the signal A and its inverse. Likewise, the second signal is B+ and B−. Although this configuration is only a two-input differential XOR gate the implementation is complex and requires the twelve bipolar transistor as is shown. Similar circuit structure to implement a n-input XOR gate requires $2^n(n+1)$ bipolar transistors. The number of required transistors increases almost exponentially as the number of inputs increase. A single 6-input XOR gate demands use of 448 bipolar transistors, and prior art implementations of a sequence generator would require multiple 6-input XOR gates as well as numerous XOR gates with a fewer number of inputs, plus additional circuit elements. The size, cost, and complexity of prior art sequence generators is enormous.

Furthermore, with such large numbers of elements, excess unwanted parasitic capacitance is introduced which reduces timing margin to unacceptable levels, which if not addressed will prevent circuit operation.

SUMMARY

To overcome the drawbacks in the prior art and provide additional benefits, disclosed is a shared error checker and sequence generator. In one embodiment, this shared error checker and sequence generator includes a sequence generator having a sequence generator input, a sequence generator output, and one or more feedback paths. The sequence generator is configured to create a generated sequence signal. An error detector is configured to compare a received sequence signal to the generated sequence signal for differences and record the differences as errors. Also part of this embodiment is an analog front end configured to receive and recover the received sequence signal from a remote transceiver. Control logic configured to selectively establish the shared error checker and sequence generator in error checker mode or sequence generator mode.

In one configuration the error detectors comprise one or more XOR gates. It is also contemplated that the sequence generator may comprise a linear-feedback shift register core configured to generate a pseudorandom binary sequence. The shared error checker and sequence generator may include one or more switching elements configured to selectively route the generated sequence signal as feedback into the sequence generator or the received sequence signal into the sequence generator. In one embodiment, the sequence generator is configured with fewer than seventy transistors. It is also contemplated that the sequence generator may be configured with fewer than three three-input XOR gates. In one configuration, the shared error checker and sequence generator is configured to output a sequence signal to be transmitted to a remote transceiver.

Also disclosed is a method of operation for a shared error checker and sequence generator to evaluate operation of a data communication system at a local transceiver. This method includes receiving, from a remote transceiver, a received sequence signal and generating a generated sequence signal at the local transceiver with a shared error checker and sequence generator. This method also includes providing the received sequence signal to the shared error checker and sequence generator and comparing, with the shared error checker and sequence generator, the received sequence signal with the generated sequence signal. Then, generating, with the shared error checker and sequence generator, an error count in response to differences between the received sequence signal and the generated sequence signal.

In one embodiment, the shared error checker and sequence generator, using control logic, can be placed into error checker mode or sequence signal generation mode. It is also disclosed that the error detector may comprises one or more XOR gates. The sequence generator may be a linear-feedback shift register core configured to generate a pseudorandom binary sequence. It is contemplated that the shared error checker and sequence generator includes one or more switching elements configured to selectively route the generated sequence signal as feedback into the sequence generator or the received sequence signal into the sequence generator. In one embodiment, the sequence generator is configured with fewer than seventy transistors. The sequence generator may be configured with fewer than three three-input XOR gates.

Also disclosed is a combined error checker and sequence generator sharing a linear-feedback shift register core. In one configuration this system includes a clock and data recovery system configured to recover a clock signal and data signal received over a channel from a remote transceiver. Also part of the system is control logic configured to activate one of two or more modes of operation of the combined error checker and sequence generator, and also an error detector configured to compare two sequence signals and record errors in response to differences between the two sequence signals. A sequence signal generator is provided and configured to generate a sequence signal for use by the error detector as a reference sequence signal or for transmission to a remote transceiver.

The error detector may be formed from one or more XOR gates. In one embodiment, the linear-feedback shift register core is configured to generate a pseudorandom binary sequence that is used by the error checker. It is contemplated that the combined error checker and sequence generator may include one or more switching elements configured to selectively route the generated sequence signal as feedback into the sequence generator or the received sequence signal into the sequence generator, subject to whether the combined error checker and sequence generator is in error checker mode or sequence generator mode. In one configuration the linear-feedback shift register core is configured with fewer than seventy transistors. In addition, the sequence generator may be configured with fewer than three three-input XOR gates.

Other systems, methods, features and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
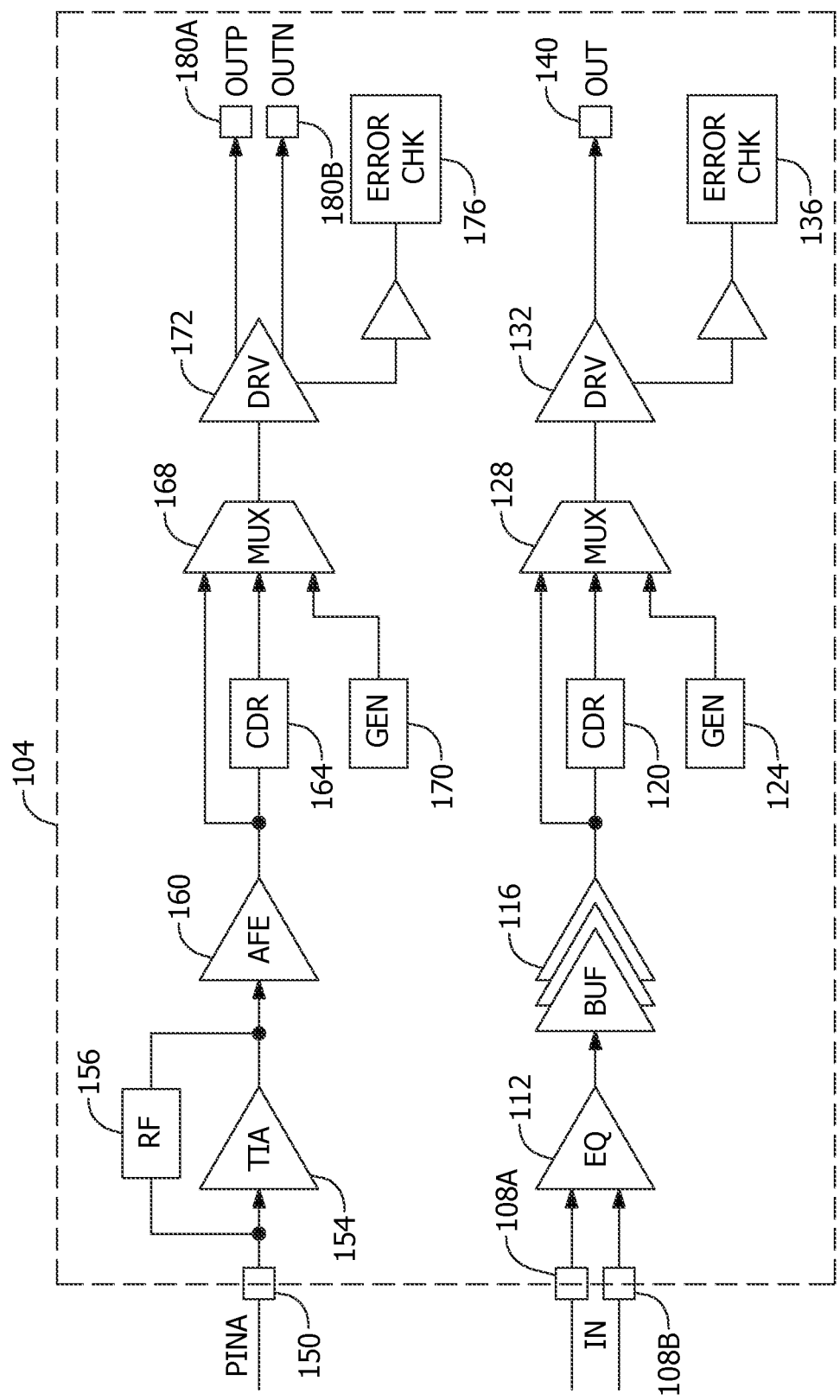
FIG. 1 illustrates a prior art transceiver having separate sequence generator and error checker.
Figure 2:
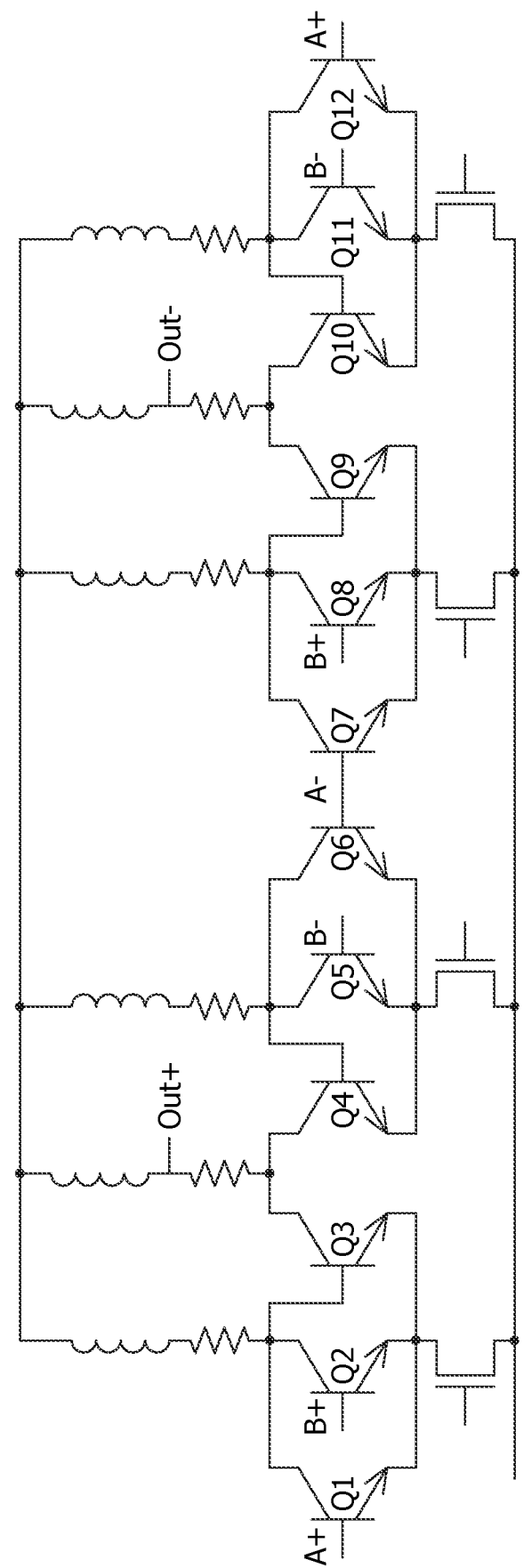
FIG. 2 illustrates an exemplary circuit for implementing two-input differential XOR gate in BICMOS.
Figure 3:
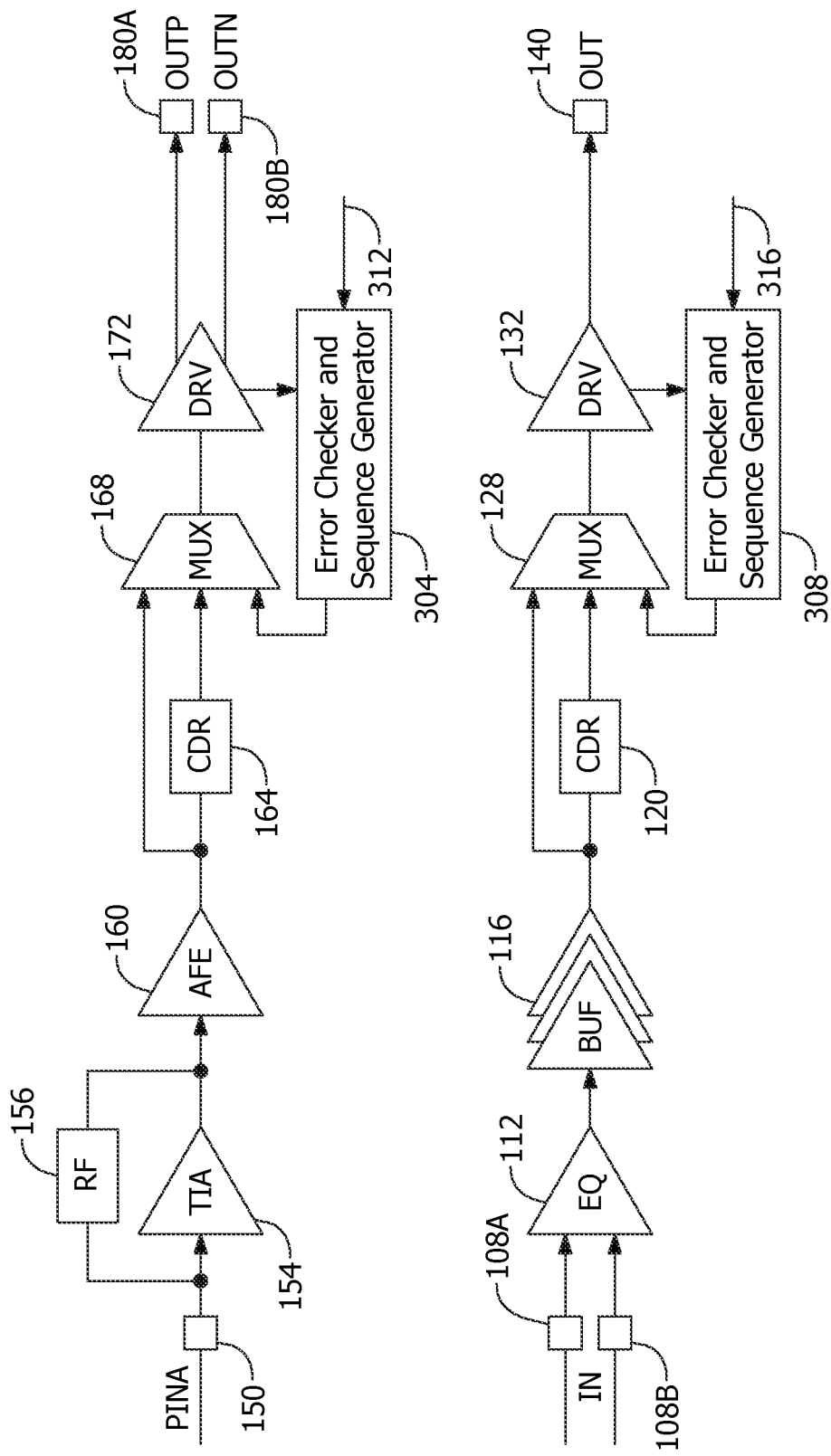
FIG. 3 illustrates an exemplary communication system having an area efficient shared error checker and sequence generator.

FIG. 3 illustrates an exemplary communication system having an area efficient shared error checker and sequence generator. This is but one possible embodiment and as such, other configurations are possible without departing from the scope of the claims. As compared to FIG. 1, similar elements are identified with identical reference numbers. As shown in FIG. 3, a combined error checker and sequence generator 304 is associated with the receive path. The error checker and sequence generator 304 provides an input to the multiplexer 168, and receives, as an input, a signal from the driver 172. One or more control inputs 312 are provided to the receive path error checker and sequence generator 304 to control input/output functions and control internal aspects of operation. A clock signal is also provided to the receive path error checker and sequence generator 304.

Associated with the transmit path is a combined error checker and sequence generator 308. The error checker and sequence generator 308 provides an output to the multiplexer 128, and receives an input from the driver 132. One or more control inputs 316 are provided to the transmit path error checker and sequence generator 308 to control input/output functions and control internal aspects of operation. A clock signal may also be provided to the transmit path error checker and sequence generator 308. It is also contemplated that the receive path error checker, the sequence generator 304, the transmit path error checker, and sequence generator 308 may be further consolidated into a single element to further reduce area requirements, cost, and complexity. As such the combined device would be shared between the transmit path and the receive path.

The configuration of FIG. 3 overcomes the drawbacks of the prior art by requiring less space, being less complex and having improved timing margin over prior art embodiments. Reductions in required space are realized by having the linear feedback shift register and some associated elements be shared between the sequence generation functions and the error checking functions and also due to improved design layout as discussed below in subsequent figures.

Figure 4:
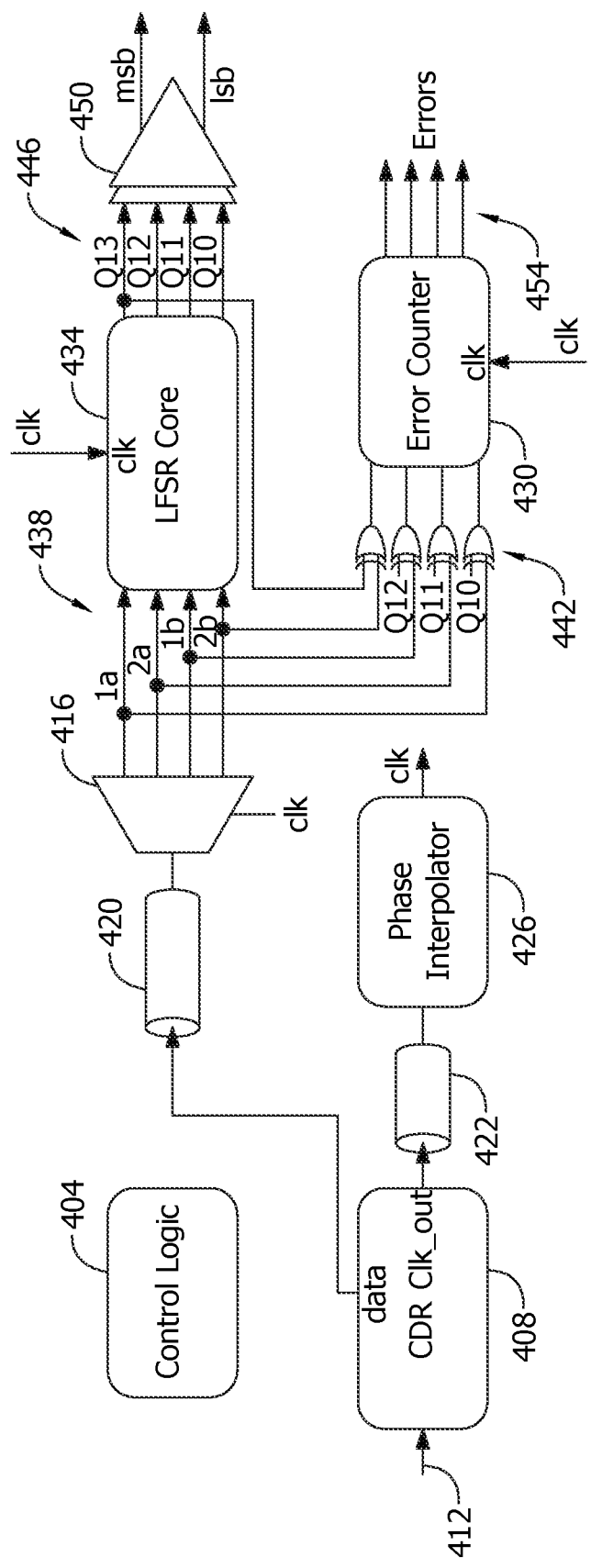
FIG. 4 illustrates a block diagram of an example embodiment of a combined sequence generator and error checker as shown in FIG. 3.

FIG. 4 illustrates a block diagram of an example embodiment of a combined sequence generator and error checker as shown in FIG. 3. This is but one possible layout and arrangement of elements, and other configurations are possible which do not depart from the scope of the claim. Control logic 404 is shown generally as being present and is dispersed throughout the system to guide operation of the various elements shown and described herein. A CDR (clock data recovery circuit) 408 receives a data signal on input 412. The CDR 408 recovers the clock and data, and then provides the data to a demultiplexer 416 via a transmission line or an equivalent trace 420. The clock signal is provided to a phase interpolator 426 which then distributes the clock signal to an error counter 430 and to at least a LFSR (linear feedback shift register) core 434.

The data provided to the demultiplexer 416 is output, based on a clock control signal, as four low rate data streams on outputs 438. The low rate data streams are provided to the LFSR core 434 and to a bank of XOR gates 442. The LFSR core 434 processes the data as described in detail below to generate low rate data outputs signals on data paths 446. The low rate output signals are provided to one or more buffers 450 and to the bank of XOR gates 442. Only one connection is shown to reduce figure clutter with the other connections designated as Q12, Q11, and Q10 and the connections show by this notation. The output of the one or more buffers 450 are provided as most significant bits and least significant bits outputs in PAM4 mode and two independent streams in NRZ mode. The XOR gates 442 compare their two inputs to determine if a difference exists between the inputs to the XOR gates. Differing inputs to the XOR gates 442 yields a logic one output, indicating an error. The error counter 430 processes the outputs from the XOR gates 442 to track errors. The error count is output on error outputs 454.

In operation, the received signal is provided to the CDR 408 which recovers the clock and data signal. The data signal is routed to the LFSR core 434 and to the bank of two input XOR gates 442. The LFSR core 434 processes the data to generate a sequence signal (pattern signal) such as for example of PRBS signal which is routed back to the bank of XOR gates 442 to function as the second input. Differences between the data (received sequence signal) input to the LFSR core 434 and the sequence signal generated by the LFSR core are recorded as errors by the error counter 430. The errors can be processed with on-chip processor or external processor to optimize system performance or diagnose problems. The output of the buffers 450 are provided to MUX 168 or 128 or any signal path that needs performance optimization or error detection.

Figure 5:
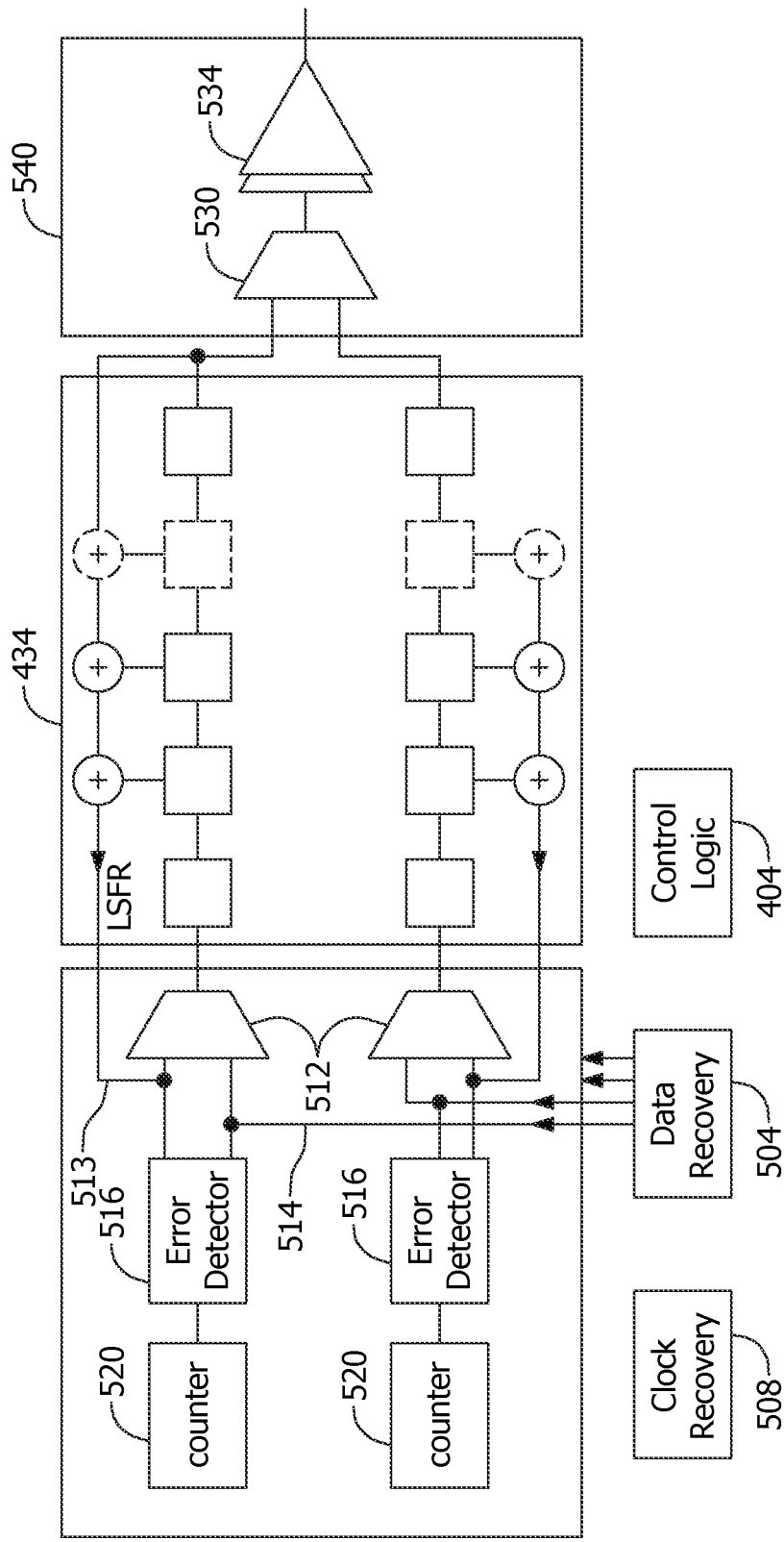
FIG. 5 illustrates a block diagram of an example embodiment of the control and feedback system for the linear feedback shift register core with a focus on error tracking.

FIG. 5 illustrates a block diagram of an example embodiment of the control and feedback system for the LFSR core with a focus on error tracking. For simplicity, only half of the circuit is drawn, and many details are omitted. The recovered clock signal from clock recovery module 508 is distributed throughout the circuit as is the control logic 404, both of which are shown generally. The recovered data from a data recover module 504 is deserialized and distributed to four multiplexers 512 as shown. The multiplexers 512 also receive, as a second input, a feedback signal from the LFSR core 434. The multiplexers 512, responsive to a control signal to select CDR output 514 in checker open-loop mode or feedback signal 513 in checker closed-loop mode and generator mode as an output.

The feedback signal from the LFSR core 434 is also provided to the error detectors 516. The error detectors 516 compare the received data to the sequence signal generated by the LFSR core 434 to detect differences. Differences between the received signal and the sequence generated by the LFSR core 434 are logged as errors by counters 520. It is contemplated that the recovered data (which may be a sequence signal received from a remote transceiver) is or should be the same as the sequence signal generated by the LFSR core. By comparing a known sequence signal transmitted from a remote transmitter, to the same sequence generated at the local receiver, errors can be detected revealing issues with operation of the remote transmitter, local receiver, or issues with the channel. Parallel branches may be used to reduce to ½ or ¼ rate reduce the effective data rate for processing which allows for use of less expensive integrated circuit technologies. Serializers and de-serializers may be used for this function.

The LFSR core 434, discussed below in more detail, is configured to generate the sequence signal. LFSR core is split into two or more paths to enable a lower rate system. The output of the LFSR core 434 is also provided to multiplexers 530 which combine the lower rate data streams into full rate data streams to one or more output buffers 534. The resulting full rate data streams are provided to the signal path for system optimization or error detection. The data rate may be further reduced with additional processing paths. Discussion of operation of the system of FIG. 5 is set forth below.

Figure 6:
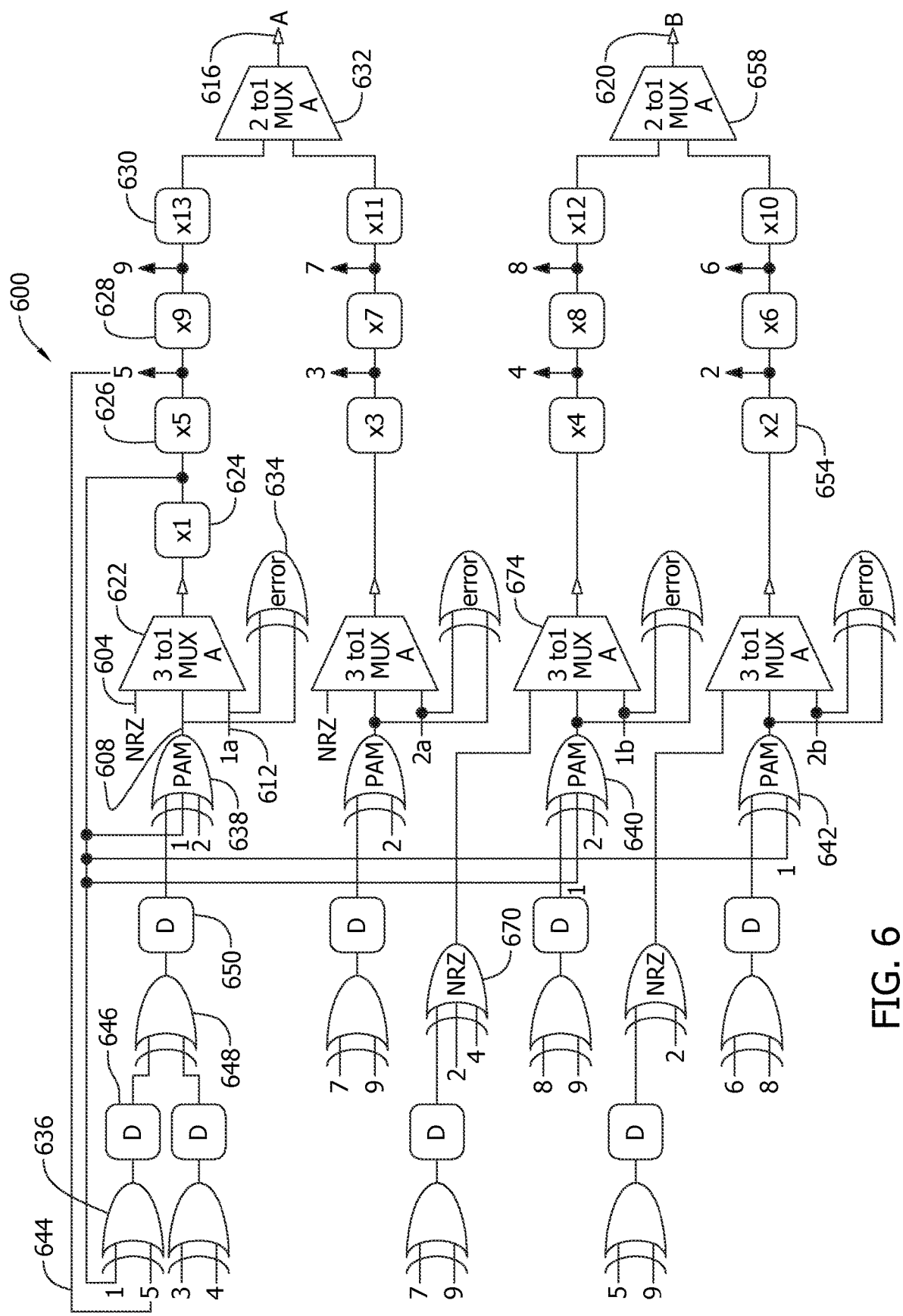
FIG. 6 illustrates an exemplary block diagram showing an exemplary control logic element layout for an improved sequence generator, such as an improved linear feedback shift register (LFSR) core.

FIG. 6 is an exemplary block diagram showing an exemplary control logic element layout for an improved sequence generator, such as an improved linear feedback shift register (LFSR) core. This is but one possible configuration and other configurations are possible which also benefit from the advancements shown in FIG. 6. The layout concepts illustratively shown by the example in FIG. 6 provide significant area reduction and improve timing margin as compared to prior art embodiments, such as those referenced in the Background section. When appropriate, only a single path is discussed to avoid duplication in discussion.

Starting at a high level, the LFSR 600 is shared between the error checker and the sequence generator as shown in FIG. 3. The MUX 622 has inputs 604, 608, 612 and outputs 616, 620. The inputs include a feedback or remapped NRZ (non-return to zero) (PAM2) input 604, a feedback PAM4 input 608 and a retimed and deserialized data stream 612 from an external source, such as inputs 1a, 1b, 2a, 2b shown in FIG. 4 from the demultiplexer 416 (FIG. 4). The NRZ input 604 is used when the system is in NRZ mode. The PAM4 input 608 is used when the system is in PAM4 mode. The differential data stream 612 is used when the system is in error checking mode. When the LFSR core is in generator mode, multiplexer 622 selects the feedback signal 608. When the LFSR core is in PAM4 checker open-loop mode, multiplexer 622 selects external input 612. When the LFSR core is in NRZ checker open-loop mode, the lower two multiplexers 622 selects external input 612. The higher two multiplexers select the NRZ signal which is from a remapped LFSR register. In checker closed-loop mode, the multiplexer 622 first selects input 612 to initialize the LFSR core registers. After all registers are loaded, multiplexer 622 switches to generator mode. As shown, an NRZ path, through the NRZ XOR gate 670, is shown as connecting to a 3 to 1 multiplexer 674. Several 3 to 1 multiplexers are shown, and each has an output which connects to a D flipflop element or register, such as register X1 624. The upper path is discussed below.

The PAM4 feedback 608 and the retimed and deserialized input data 612 are provided to a two input XOR gate 634 which functions as an error checker. The XOR gates 634 compare the two inputs and output a logic one value if the inputs are different, indicating an error, and a logic 0 value if the inputs are the same, indicating no error (no difference between the two inputs). The output of the XOR gate 634 may be provided to an error counter, such as error counter 430 as shown in FIG. 4. The other paths operate generally similar and as such are not discussed.

The output of the multiplexer 622 feeds into the register X1 624 which functions as a memory and delay. The register X1 624 generates an output which is provided to a register X5 626 and is fed back to a two input XOR gate 626 and to a three input XOR gate 638, as well as to XOR gates 640, 642 as shown. To simplify FIG. 6, numerous feedback paths have been omitted and number notation is used to identify feedback paths. For example, register X1 624 feeds back to every XOR gate that has a 1 in front of its input. The output of register X5 is provided as an input to register X9 628 and is fed back to serve as an input to every XOR gate that is labeled with a 5, such as shown by feedback path 644. The output of register X9 628 is provided to the input of register X13 630, and is fed back as an input to every XOR gate having an input labeled with a 9. The output of register X13 is provided as an input to the multiplexer 632. The same notation is followed for the other paths shown in FIG. 6. Each individual path and feedback loop are not discussed in detail to avoid duplication.

Returning to XOR gate 636, its output is provided to a flip-flop 646, and the output of the flip-flop is provided to another XOR gate 648. The output of the XOR gate 648 is provided to a flip-flop 650. As is understood in the art, the flip-flops 646, 650 delay the signal by one or more clock cycles to maintain clock alignment and timing margin. Numerous other flip-flops are shown in FIG. 6 but not discussed in detail. The output of the flip-flop 650 is provided as in input to the three input XOR gate 638. The other two inputs to the XOR gate 638 are feedback signals from register X1 624 and from register X2 654.

The lower two paths generate an output 620 from a multiplexer 658. The multiplexers 616, 620 provide half rate to full rate conversion. The outputs 616 and 620 provide signals such for PAM4, there are two streams (defining a four-level signal) while for NRZ there is one output (defining two-level signal). To aid in understanding, outputs 616, 620 correspond to the outputs from the buffer 450 as shown in FIG. 4. The parallel sequence generator and checker can have many parallel branches configured to operate at ½, ¼, ⅛ data rate. It can also have multiple outputs for NRZ and PAM4 signals.

The delay in interconnection wires and XOR gates deteriorate timing margin. However, the LFSR core is a clocked system. The D-flipflops retime the feedback signals to restore timing margin to an amount generally equivalent to one three-input XOR gate delay. This is a significant improvement over the prior art. A signal "xn" delayed by one register is "xn+4". The signal "xn" delayed by two-registers is "xn+8". Therefore, the feedback loop in the first row in FIG. 6 realizes x1+x2+x9+x11+x12+x13 with only one XOR gate delay plus one multiplexer delay. The XOR gates in the feedback loop requires only 68 bipolar transistors. If the feedback loop were implemented with a six-input XOR gate, it will require 448 bipolar transistors. Thus, the disclosed configuration and method not only reduces the area to 15% of the original, but also limits the delay in the feedback loop to one XOR gate delay plus one multiplexer delay plus interconnection delay. This is a significant improvement over the prior art. As a result, the embodiment of FIG. 6 improves timing margin and reduces the required area for implementation.

Further, in this embodiment the maximum number of inputs to any XOR gate is limited to three inputs, which greatly reduces the required implementation area. The flip flops sample and retime the XOR gates' outputs in the feedback loops to restore timing margin. A searching algorithm executed on this design shows the initial states of the flip flops in the feedback loops do not affect the LFSR as a generator or checker if they are reset properly. The retiming stages in the LFSR feedback loops reduce area and improve timing margin.

In FIG. 6, the total number of bipolar transistors in the circuit required to realize a 6-input XOR gate functionality is 68 which is much less than the one-stage solution which requires 448 transistors. Simulations of other embodiments, such as the direct cascading solution, only has 3 picoseconds timing margin at 58 Gbps at normal corner. The embodiment shown in FIG. 6 has 10.5 picoseconds timing margin under the same simulation conditions.

In area dominant designs, supporting both none-return-to-zero (NRZ) PRBS13 generator and checker and PAM4 PRBS13 generator and checker makes the area-constraint more challenging. Therefore, another two methods to reduce the required area are discussed here.

The first method is to remap the registers in FIG. 6 to avoid extra area cost for NRZ LFSR core. Although NRZ generator does not require extra circuit, the LFSR core for NRZ checker is different from that of Pulse-Amplitude-Modulation 4-Level (PAM4). In NRZ checker mode, there is only one input stream which is different from two input streams in PAM4. The NRZ input stream can be deserialized into 2 streams or 4 streams. It becomes quarter rate if deserialized into 4 streams, which needs another phase interpolator (PI) to synchronize data and clock. Remapping allows reuse of all DFFs in the PAM4 LFSR core without an extra PI because the core still runs at half-rate. It is a more area efficient method. Remapping is shown in FIG. 6.

The sequence signal that is generated may be any type sequence signal. A generation polynomial, defined as $1+x+x^2+x^{12}+x^{13}$, in terms of circuit implementation is more difficult than some higher order generation polynomials, and is used to discuss the design methods here. High-speed applications prefer parallel structure that allows the LFSR core to run at lower rate. In a 4-branch parallel PRBS13 LFSR core, the feedback loop to register x1 is:

$$q'_1 = q_1 + q_2 + q_9 + q_{11} + q_{12} + q_{13} \quad (1)$$

where $q'_1$ is the next state of register x1, and $q_1$ is the current state of register x1. This feedback loop requires a 6-input XOR gate. In addition, register x1 itself also appears in the feedback loop inputs, which complicates strategy to retime with D flip flops.

In bipolar differential implementation, an n-input XOR gate usually needs $(n+1)2^n$ bipolar transistors. Hence, not only is the area of a 6-input XOR gate 37 times larger than a 2-input XOR gate, but also its parasitic input capacitance and output capacitance become bottleneck for high-speed operation. Cascading 3-input and 2-input XOR gates reduces the area but deteriorates timing margin by introducing extra delay in the feedback loop.

Moving from the layout and hardware of the example embodiments of the innovation, a discussion of the benefits over the prior art and operation is provided. In this disclosure, two methods are used to reduce the required area to implement PRBS binary and quaternary generator and checker. The first technique is to use a shared sequence signal generation core. As shown in FIG. 3 a shared linear feedback shift register (LFSR) core is used for the generator and the checker. Because the core takes up most of the area in the generator and the checker is sharing the sequence signal generation core greatly reduces the area of the most area consuming part by half. The second method is to realize multiple input XOR gate functionality with 2-input and 3-input XOR gates and retime intermediate outputs with D flip flops. The second method also improves timing margin to allow the sequence signal generator and error checker to work at higher frequencies.

In operation, the shared system with the shared LFSR core can be used in either sequence generator mode or error checker mode. Operation is discussed below in more detail.

Operation in Sequence Generator Mode

Figure 7:
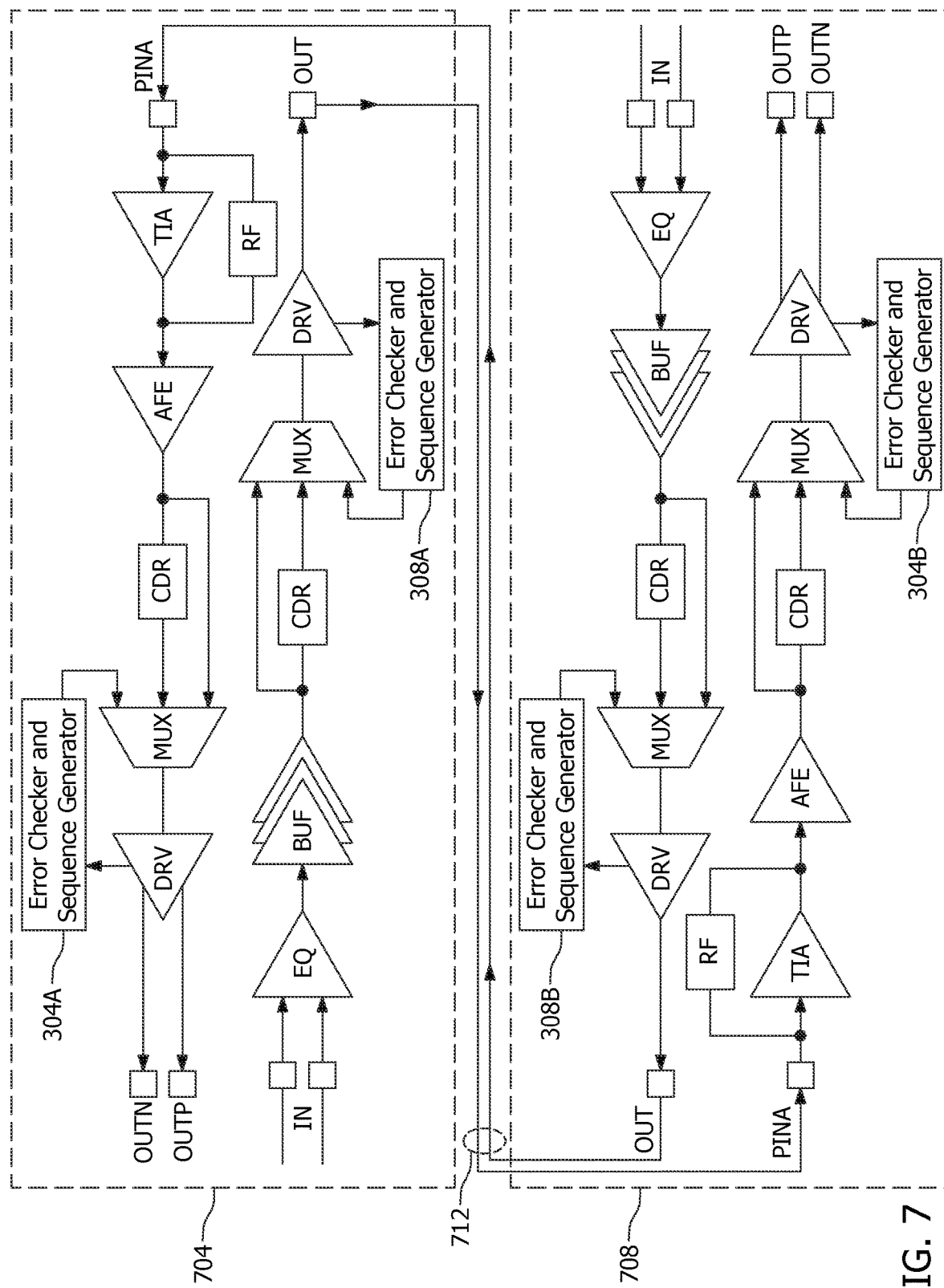
FIG. 7 illustrates a local transceiver and a remote transceiver which are connected via a channel.

The system may be used in sequence generator mode to generate a sequence signal that is used to verify operation of certain local transmit functions, channel characteristics, and remote receiver functions. This is best understood in relation to FIG. 7 which illustrates a local transceiver 704 and a remote transceiver 708 which are connected via a channel 712. In sequence generator mode, the combined error checker and sequence generator 308A generates a sequence signal and transmits the sequence signal over the channel 712 from the local transceiver 704 to the remote transceiver 708. At the remote transceiver 708, the sequence signal is received and processed as would occur for data.

Similarly, the combined error checker and sequence generator 308B generates a sequence signal and transmits the sequence signal over the channel 712 from the remote transceiver 708 to the local transceiver 704. At the local transceiver 704, the sequence signal is received and processed as would occur for data.

In both situations, to confirm operation of the transmitter and the receiver processing and evaluate the channel an identical sequence signals are generated and compared to the received sequence sent from the opposing transceiver. The comparison is performed by the error checker of the combined error checker and sequence generator and errors are tracked and recorded.

In particular, the combined error checker and sequence generator 308A is placed in sequence generation mode causing it to generate a sequence signal that is transmitted from the local transceiver 704 over the channel 712 to the remote transceiver 708. At the remote transceiver 708, the received sequence signal is processed. At the remote transceiver 708 the combined error checker and sequence generator 308B is placed in sequence generation mode and the same sequence signal, as transmitted from transceiver 704, is generated. The incoming sequence signal (from the local transceiver 704) is compared to the sequence signal generated by the combined error checker and sequence generator 308B at the remote transceiver 708. The combined error checker and sequence generator, at the other station, sends the generated sequence to the channel. After passing through the channel, the remote transmitter receives it as an input. The CDR recovers clock and data and sends to the checker. In this case, the same LFSR core is used. The CDR cope with the delay in the channel. To perform the comparison and track errors, the combined error checker and sequence generator 308B is placed in error checking mode. With this process, the transceiver provides an internal, space efficient sequence generator and error checker that can be used to evaluate and test the transmitter, channel, and receiver.

Operation in Error Checker Mode

As discussed above, the combined error checker and sequence generator can also be placed in error checker mode to compare the incoming sequence signal to a received sequence signal to compare the two signals to check for errors and record the errors with an error counter.

General Discuss of Operation

In reference to FIG. 5, the multiplexer 530 combines parallel LFSR outputs from the LSFR core 434 to generate binary or quaternary PRBS output. The output buffer 534 buffers the outputs to drive next stage circuits. In one embodiment, to save power, the multiplexer 530 and buffers 534 are only powered up when the generator mode is activated. To save power, the data recovery 504, multiplexers 512, error detectors 516, and error counters 520 may be only powered up when the error checker mode is activated. The combined generator and checker share the clock recovery module 508.

The generator and checker circuits are controlled by the control logic block 404. The control logic block 404 is capable of configuring several different modes of operation to enable error checker mode and sequence signal generator mode.

Generator Only Mode

One possible mode is a sequence signal generator only mode. In sequence signal generator only mode, the LFSR core 434, multiplexer 530, buffer 534, clock recovery 508 and control logic 404 are active. Other elements are powered down to reduce power consumption. In this mode of operation, the clock recovery 508 may be a local clock source.

Checker Only, Open Loop Mode

The combined sequence generator and error checker may also operate in checker only, open loop mode. In checker only, open loop mode, the LFSR core 434 feedback loops are open by the multiplexer 512 and as such the output of the LFSR core is only directed to the error detectors 516. As a result, the only input to the multiplexers 512 is the output of the data recovery module 504 which enters and is processed by the LFSR core causing the feedback loops to generate new bits. The new bits are compared with received data by the error detectors 516 to detect errors. The error counter 520 counts and records the number of errors, if any such errors are detected.

Checker Only, Closed Loop Mode

The combined sequence generator and error checker may also operate in checker only closed loop mode. In this mode, the LFSR core 434 feedback loops are closed by multiplexer 512. As a result, recovered data from module 504 enters the LFSR core 434 only at the synchronization phase. The synchronization phase is defined as all registers in the LSFR core are loaded with error free bits from the data recovery outputs. This step synchronizes the local LFSR core with the LFSR core in the remote transmitter. Data and clock recovery takes into account delay between the two LFSR cores. After synchronization, the multiplexers 512 switch to only local feedback from the LFSR core 434. The new bits generated by feedback loops are compared with received (recovered) data to detect errors. Errors are detected by the error detectors 516 and counted by the error counters 520. In checker only, closed loop mode the multiplexers 530 and the buffers 534 may be powered down.

Generator Plus Checker Mode

The combined sequence generator and error checker may also operate in generator plus checker mode. In generator plus checker mode, the LFSR core 434 feedback loops are closed. The received data from data recover module 504 enters the LFSR core 434 only at the synchronization phase. For example, in one embodiment, the LFSR core is a state machine whose output is determined only by its current state. The system provides the received sequence to initialize the LFSR core in the checker mode. In one embodiment the core has 13 registers and the number of internal states is $2^{13}-1=8191$. Therefore, the sequence is 8191 bits long.

After synchronization, multiplexer 512 switches to local feedback resulting in the input to the LSFR core 434 being the feedback signal. The resulting LFSR outputs are compared, by the error detectors 516, with received data from the data recovery module 504 to detect errors. Data errors are recorded by the counters 512. During operation in generator plus checker mode, the multiplexer 530 and the buffers 534 are powered up.

Low Power Mode

The combined sequence generator and error checker may also operate in low power mode. In low power mode, only the control logic 404 is powered up. After system optimization or diagnosis is finished, PRBS generator and checker are not used by the system and low power mode helps to save power and lowers temperature While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A shared error checker and sequence generator comprising:
    a sequence generator having a sequence generator input, a sequence generator output, and one or more feedback paths, the sequence generator configured to create a generated sequence signal;
    an error detector configured to compare a received sequence signal to the generated sequence signal for differences and record the differences as errors;
    an analog front end configured to receive and recover a received sequence signal from a remote transceiver; and
    control logic configured to selectively establish the shared error checker and sequence generator in error checker mode or sequence generator mode;
    wherein the shared error checker and sequence generator includes one or more switching elements configured to selectively route the generated sequence signal as feedback into the sequence generator or the received sequence signal into the sequence generator, and the error checker and sequence generator are consolidated into a single element and shared between the transmit path and the receive path.

2. The shared error checker and sequence generator of claim 1 wherein the error detector comprises one or more XOR gates.

3. The shared error checker and sequence generator of claim 1 wherein the sequence generator comprises a linear-feedback shift register core configured to generate a pseudorandom binary sequence.

4. The shared error checker and sequence generator of claim 1 wherein the sequence generator is configured with fewer than seventy transistors.

5. The shared error checker and sequence generator of claim 1 wherein the sequence generator is configured with fewer than three three-input XOR gates.

6. The shared error checker and sequence generator of claim 1 wherein the shared error checker and sequence generator is configured to output a sequence signal to be transmitted to a remote transceiver.

7. A method for operation for a shared error checker and sequence generator to evaluate operation of a data communication system at a local transceiver comprising:
    receiving, from a remote transceiver, a received sequence signal;
    generating a generated sequence signal at the local transceiver with a shared error checker and sequence generator;
    providing the received sequence signal to the shared error checker and sequence generator;
    comparing, with the shared error checker and sequence generator, the received sequence signal with the generated sequence signal; and
    generating, with the shared error checker and sequence generator, an error count in response to differences between the received sequence signal and the generated sequence signal;
    wherein the shared error checker and sequence generator, using control logic, is configured with an error checker mode and a sequence signal generation mode, and the shared error checker and sequence generator includes one or more switching elements configured to selectively route the generated sequence signal as feedback into the sequence generator or the received sequence signal into the sequence generator, and the error checker and sequence generator are consolidated into a single element and shared between the transmit path and the receive path.

8. The method of claim 7 wherein the error detector comprises one or more XOR gates.

9. The method of claim 7 wherein the sequence generator comprises a linear-feedback shift register core configured to generate a pseudorandom binary sequence.

10. The method of claim 7 wherein the sequence generator is configured with fewer than seventy transistors.

11. The method of claim 7 wherein the sequence generator is configured with fewer than three three-input XOR gates.

12. A combined error checker and sequence generator sharing a linear-feedback shift register core comprising:
    a clock and data recovery system configured to recover a clock signal and data signal received over a channel from a remote transceiver;
    control logic configured to activate one of two or more modes of operation of the combined error checker and sequence generator;
    an error detector configured to compare two sequence signals and record errors in response to differences between the two sequence signals; and
    a sequence signal generator configured to generate a sequence signal for use by the error detector as a reference sequence signal or for transmission to a remote transceiver;
    wherein the combined error checker and sequence generator, using control logic, is configured with an error checker mode and a sequence signal generation mode, and the error checker and sequence generator are consolidated into a single element and shared between the transmit path and the receive path.

13. The combined error checker and sequence generator of claim 12 wherein the error detector comprises one or more XOR gates.

14. The combined error checker and sequence generator of claim 12 wherein the linear-feedback shift register core is configured to generate a pseudorandom binary sequence that is used by the error checker.

15. The combined error checker and sequence generator of claim 12 wherein the combined error checker and sequence generator includes one or more switching elements configured to selectively route the generated sequence signal as feedback into the sequence generator or the received sequence signal into the sequence generator subject to whether the combined error checker and sequence generator is in error checker mode or sequence generator mode.

16. The combined error checker and sequence generator of claim 12 wherein the linear-feedback shift register core is configured with fewer than seventy transistors.

17. The combined error checker and sequence generator of claim 12 wherein the sequence generator is configured with fewer than three three-input XOR gates.

* * * * *